United States Patent [19]

Crawford et al.

[11] Patent Number: 5,987,388
[45] Date of Patent: Nov. 16, 1999

[54] AUTOMATED EXTRACTION OF FAULT SURFACES FROM 3-D SEISMIC PROSPECTING DATA

[75] Inventors: Michael F. Crawford, Allen; Donald A. Medwedeff, Plano, both of Tex.

[73] Assignee: Atlantic Richfield Company, Los Angeles, Calif.

[21] Appl. No.: 08/998,466

[22] Filed: Dec. 26, 1997

[51] Int. Cl.$^6$ ............................................. G06F 19/00
[52] U.S. Cl. ................................................. 702/16; 367/70
[58] Field of Search .................................. 702/16, 17, 11, 702/12, 13, 14; 367/72, 70, 73, 71, 69

[56] References Cited

U.S. PATENT DOCUMENTS

| | | | |
|---|---|---|---|
| 4,745,550 | 5/1988 | Witkin et al. .............................. | 702/11 |
| 5,038,378 | 8/1991 | Chen ......................................... | 367/69 |
| 5,416,750 | 5/1995 | Doyen et al. ............................. | 702/14 |
| 5,563,949 | 10/1996 | Bahorich et al. . | |

OTHER PUBLICATIONS

Mikereit, et al., "Multiattribute Processing of Seismic Data: Application to Dip Displays", *Canadian Journal of Exploration Geophysics*, vol. 26, No. 1 and 2 (1990), pp. 47–53.

Steeghs, et al., "Extraction of Attributes from 3D Seismic Data" 58th Conference and Technical Exhibition, Paper X032 (EAGE, 1996).

Finn, et al., "Estimation of Three–Dimensional Dip and Curvature from Reflection Seismic Data", Expanded Abstracts of the Technical Programm of the 56th Annual International Meeting and Exposition, Paper S3.1 (SEG, 1986), pp. 355–358.

Dalley, et al., "Dip and azimuth displays for 3D seismic interpretation", *First Break*, vol. 7, No. 3 (1989), pp. 86–95.

Vanderbrug, "Line Detection in Satellite Imagery", *Trans. on Geoscience Electronics*, vol. GE–14, No. 1 (IEEE, 1976), pp. 37–44.

Gurney, "Threshold Selection for Line Detection Algorithms", *Trans. on Geoscience and Remote Sensing*, vol. GE–18, No. 2 (IEEE, 1980), pp. 204–211.

Riazanoff, "Ridge and valley line extraction from digital terrain models", *Int. J. Remote Sensing*, vol. 9, No. 6 (1988), pp. 1175–1183.

Hutchinson, "FZAP! 1.0 Offers Automated Fault Picking", Internet document (Landmark Graphics Corporation, May/Jun. 1997).

Finn, "Estimation of Three Dimensional Dip and Curvature From Reflection Seismic Data", unpublished thesis, (University of Texas at Austin, 1986), pp. v–vi, Abstract only.

*Primary Examiner*—Donald E. McElheny, Jr.
*Attorney, Agent, or Firm*—Anderson, Levine & Lintel

[57] ABSTRACT

An automated method of processing a fault-enhanced 3-D seismic volume (V) to locate and interpret faults is disclosed. The method includes processing of individual lateral slices ($LS_j$) of the volume (V). For each slice ($LS_j$), stripe artifacts are eliminated (36) by adjusting pixel values to account for lines that are unduly bright or dim (and thus artifacts of processing). Linear features are enhanced by applying a modified Gurney-Vanderburg algorithm (62) to pixel windows, such that intensity values of pixels are enhanced according to the extent to which the pixels reside in a line. Detection of lines in the enhanced lateral slice is then performed by summing pixel intensities over a window at varying directions (72), and associating, with a center pixel, an amplitude value corresponding to the maximum sum and a direction value associated with this sum. The amplitude and direction values are used to trace lines (84) by examining adjacent pixels of high amplitude in directions similar to the direction values of locally maximum amplitude values. The resulting vectors are linked (44) among lateral slices into surfaces that are representative of faults.

17 Claims, 12 Drawing Sheets

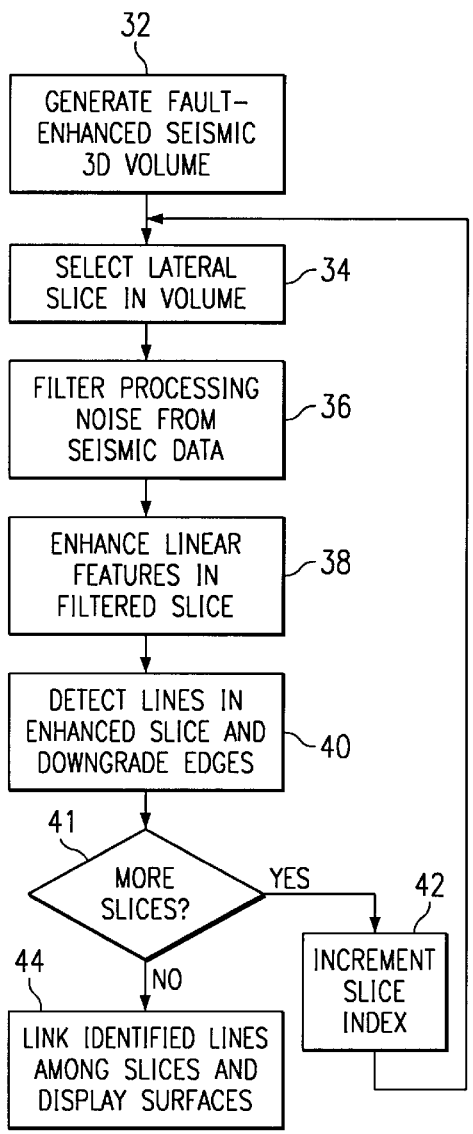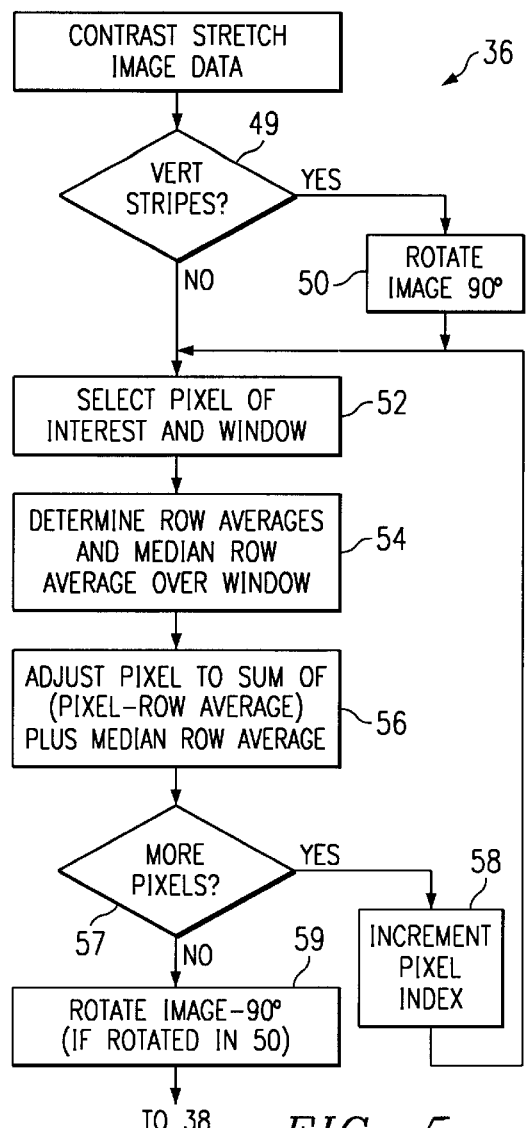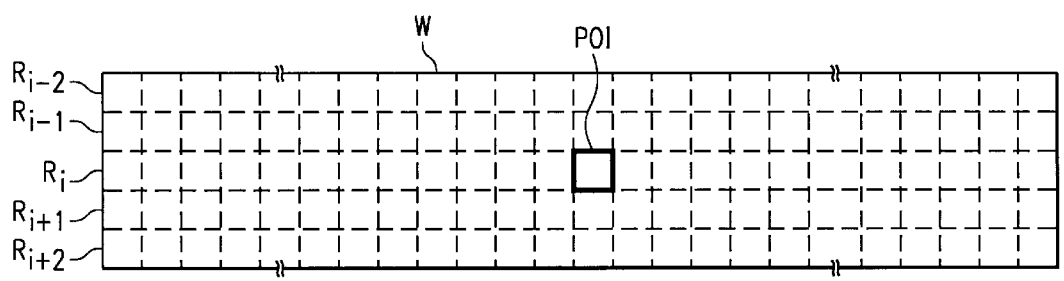

5,987,388

AUTOMATED EXTRACTION OF FAULT SURFACES FROM 3-D SEISMIC PROSPECTING DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of seismic prospecting, and is more specifically directed to the automated extraction of signals indicative of faults from seismic survey signals.

As is fundamental in the field of geology, particularly as applied to the prospecting for oil and gas, faults are surfaces within the earth's crust at which sedimentary layers and other geological features are disrupted, so as to be no longer smoothly continuous. As is well understood in the field, faults can form effective barriers to subsurface hydrocarbon flow, causing oil and gas to accumulate at faults in some cases. Accordingly, the detection and characterization of faults is an important tool in the search for oil and gas reserves, and the accuracy with which such faults can be detected and characterized can have significant impact in identifying and exploiting these reserves.

Seismic prospecting techniques are a fundamental tool in modern oil and gas prospecting, as these techniques provide efficient generation of subsurface surveys over a relatively wide region of the earth, in both land-based and marine contexts. With the advent of improved signal gathering and analysis technologies, three-dimensional ("3-D") seismic surveys are now commonly generated from seismic survey signals, permitting the analyst to more accurately visualize and characterize apparent subsurface discontinuities.

As noted above, faults are important subsurface features that are often of interest to the geologist. According to conventional techniques, the identification of faults in coherent 3-D seismic volumes is typically performed by human analysts, through manual identification and interpretation (i.e., "picking") of potential faults from seismic amplitude data. Of course, manual fault picking is an extremely time consuming process, and is thus quite costly. Additionally, manual interpretation is to a large extent dependent upon the skill, experience, and subjectivity of the individual analyst, resulting in imprecise results.

By way of further background, the automated calculation of correlation or coherency values from 3-D seismic amplitude data is known in the art. According to this approach, an example of which is described in U.S. Pat. No. 5,563,949, geologic discontinuities such as faults are directly imaged from non-correlation or non-coherency events in the 3-D seismic volume. However, this approach and other conventional methods do not provide any sort of automatic or quantitative interpretation of faults, but instead simply image the location of discontinuities in the dataset.

By way of still further background, the elimination of horizontal stripe artifacts from satellite images of the surface of the earth is known, as described in Mather, P. M., *Computer Processing of Remotely-Sensed Images* (John Wiley & Sons, 1987).

By way of still further background, techniques for extracting ridge and valley lines from digital terrain models are known in the art Examples of these techniques are described in Riazanoff et al., "Ridge and valley line extraction from digital terrain models", *Int. J. Remote Sensing*, Vol. 9, No. 6 (1988), pp. 1175–83.

BRIEF SUMMARY OF THE INVENTION

It is therefore an object of the present invention to provide an automated method and system for identifying and interpreting faults from seismic amplitude volumes.

It is a further object of the present invention to provide such a method and system in which noise in the acquisition, leveling, and processing of the seismic signals is removed prior to interpretation.

It is a further object of the present invention to provide such a method and system in which linear features in the image from the seismic amplitude volumes are enhanced.

It is a further object of the present invention to provide such a method and system which is particularly applicable to 3-D seismic amplitude volumes.

It is a further object of the present invention to provide such a method and system in which edge features are distinguished from linear features such as faults.

Other objects and advantages of the present invention will be apparent to those of ordinary skill in the art having reference to the following specification together with its drawings.

The present invention may be implemented into a computer system, and method of operating the same, which receives a fault-enhanced 3-D seismic volume, and which sequentially processes slices, or "2-D volumes" from the received 3-D volume to remove processing noise. Linear features in each slice are then enhanced and detected, to produce vector files for these features. Detection of lines is effected through the use of local differences and angle data, which renders a high degree of accuracy in an efficient automated matter. These vector files, as generated from each of multiple slices, are then linked into 3-D surfaces that may be readily displayed or output as representative of potential faults in the surveyed region.

BRIEF DESCRIPTION OF THE SEVERAL VIEWS OF THE DRAWING

The file of this patent contains at least one drawing executed in color. Copies of this patent with color drawings will be provided by the Patent and Trademark Office upon request and payment of the necessary fee.

FIG. 3 is a flow diagram illustrating the general operation of the computer system of FIG. 2 in performing the automated fault identification and interpretation process according to the preferred embodiment of the invention.

FIG. 5 is a flow diagram illustrating the operation of the process of filtering vertical or horizontal stripes from lateral slices in the process of FIG. 3 according to the preferred embodiment of the invention.

FIG. 6 is an illustration of an image window in the display as used in the process of FIG. 5 according to the preferred embodiment of the invention.

DETAILED DESCRIPTION OF THE INVENTION

Figure 1:
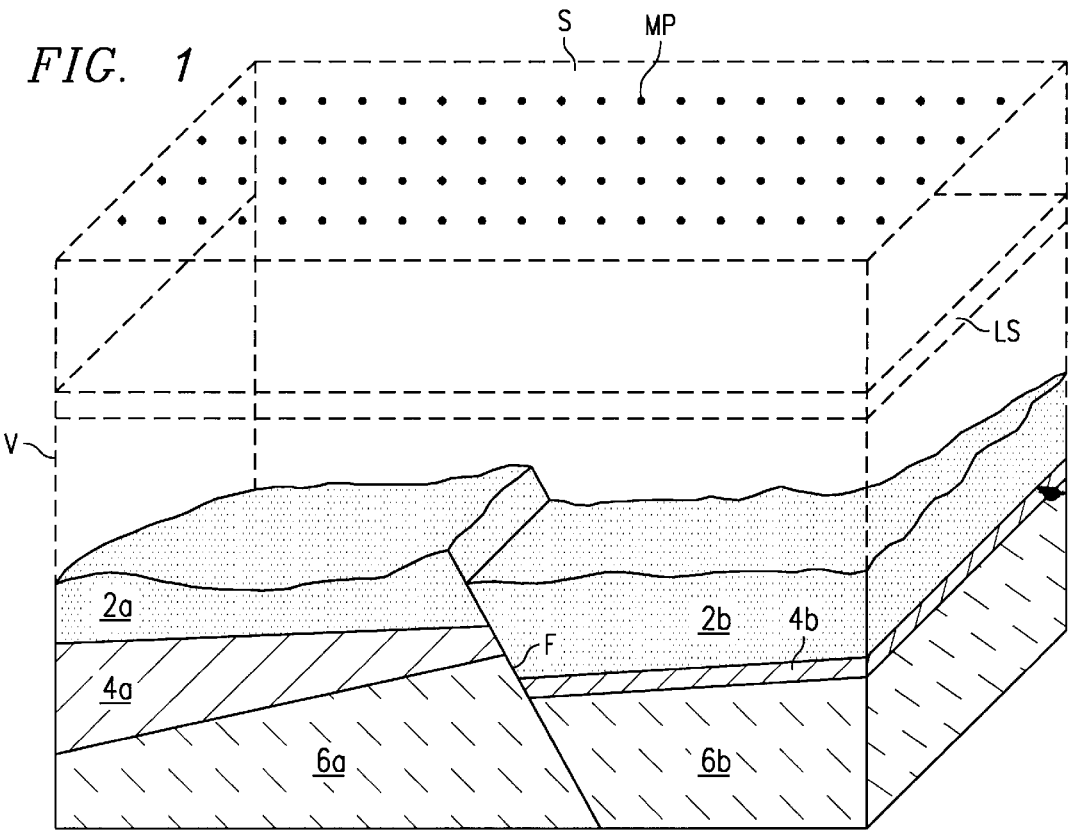
FIG. 1 is a perspective diagram of an exemplary volume of the earth, illustrating the presence of a fault therein.

Referring first to FIG. 1, an exemplary volume V of the earth over which a seismic survey is to be interpreted according to the preferred embodiment of the invention will now be described. The present invention is particularly directed to the identification and interpretation of geological faults because, as noted above, significant oil and gas reserves can reside at faults because of the barrier to hydrocarbon flow that is presented at the fault plane.

FIG. 1 is a perspective view of volume V of the earth, illustrating the location of exemplary strata 2, 4, 6 of differing composition; of course, additional strata, not shown for clarity of illustration, will be in place above stratum 2 and beneath surface S. As such, FIG. 1 illustrates an exemplary fault F which divides stratum 2 into portions 2a, 2b, stratum 4 into portions 4a, 4b, and stratum 6 into portions 6a, 6b in this exemplary volume V. In this example, fault F may be classified as a "normal" fault, as strata portions 2a, 4a, 6a are on the upward side of fault F, with the plane defined by fault F leaning toward these upward portions 2a, 4a, 6a. As is well known in the art, other types of faults include reverse (or thrust) faults, strike-slip faults, Horst faults, Graben faults, and others. In this example, if stratum 4 contains hydrocarbons, fault F could cause these hydrocarbons to gather in stratum portion 4b adjacent to fault F, or alternatively in stratum portion 4a adjacent to fault F, depending upon the pressure gradients within stratum 4.

In any event, it is highly desirable to obtain and interpret seismic surveys so as to identify the location and characteristics of faults such as fault F in FIG. 1. Such surveys are conventionally obtained by imparting acoustic energy into one or more locations at the surface of the earth overlying the volume to be surveyed, and detecting reflections of this energy at multiple other locations at the surface; as is fundamental in the art, such surveys may be performed both on land or in a marine context. Two-dimensional (2-D) surveys involve the analysis of signals from receivers or detectors that are collinear with the source locations; multiple parallel 2-D surveys can provide some amount of three-dimensional survey information regarding the subsurface volume. However, many modern seismic surveys are performed in a three-dimensional (3-D) manner, in which reflections are detected and analyzed at varying azimuths and offsets relative to the source locations, enabling relatively complete 3-D analysis of the subsurface. As is conventional in the art, gathers of seismic reflection signals (or traces) are obtained according to common midpoints among pairs of source and receiver combinations. After the application of normal move-out (NMO) corrections to account for the time differences among the gathered traces of varying offsets, summation of the gathered traces over varying offset (and azimuth) eliminates random noise in the "stacked" signal. FIG. 1 illustrates the locations of midpoints MP at surface S of the earth (or water, in the marine context) for an exemplary survey of volume V.

The present invention is directed to the analysis of seismic survey signals, as may be obtained at surface S of volume V in FIG. 1, so as to identify the location and characteristics of faults such as fault F. According to the preferred embodiment of the present invention, this analysis is performed in an automated fashion, using a computer system, as will now be described by way of example relative to FIG. 2.

Figure 2:
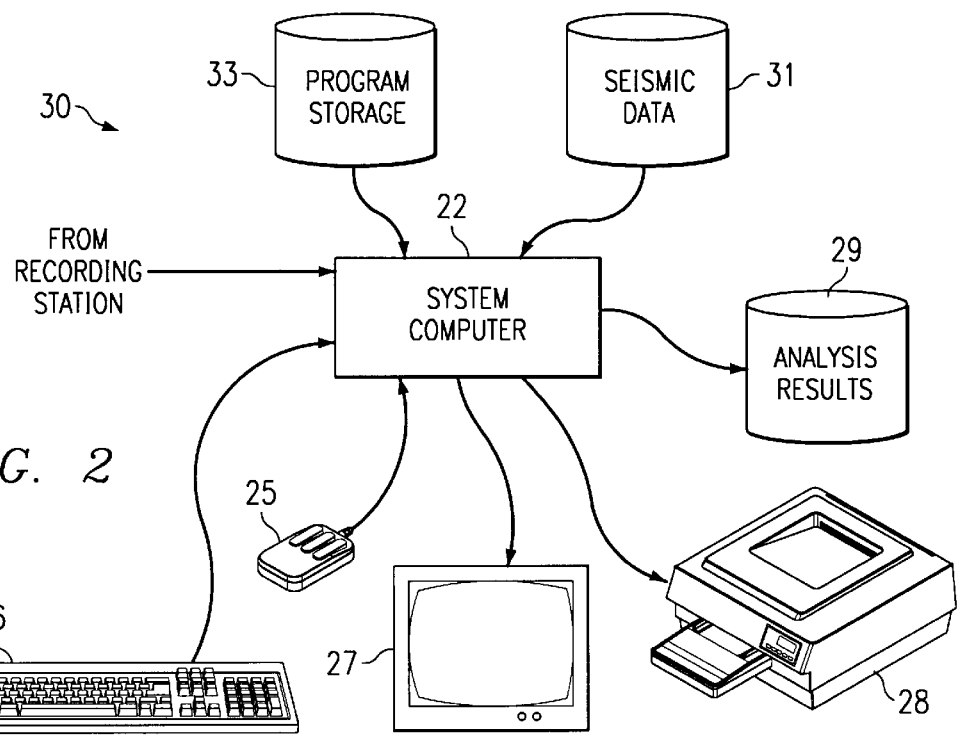
FIG. 2 is an electrical diagram, in block form, of a computer system programmed to perform an automated fault identification and interpretation process according to the preferred embodiment of the invention.

Referring now to FIG. 2, the construction of analysis computer system 30 according to the preferred embodiment of the present invention will now be described. This description of analysis computer system 30 is merely an example, as it is to be understood that the present invention may be implemented into a computer system of any suitable architecture, including large mainframe computer systems, distributed computer systems, and the like. It is contemplated that those of ordinary skill in the art will be able to implement the present invention on various arrangements of computer systems.

Analysis computer system 30 includes system computer 22, which may be implemented as any conventional personal computer or workstation, preferably a personal computer (PC) workstation as is well known in the art, implemented either in standalone fashion or as part of a network arrangement. System computer 22 is in communication with disk storage devices 29, 31, 33, which are preferably embodied in one or more hard disk storage devices within system computer 22, or alternatively in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may of course be used to store any and all of the results, program instructions, and seismic survey signals, as desired.

In this embodiment of the invention, data corresponding to seismic survey signals are received by system computer 22 from a recording station or the like, are stored in digital form on disk storage device 31. Alternatively, it is contemplated that analysis computer system 30 may operate upon previously obtained seismic survey signals, in which case the data corresponding to seismic survey signals may already be stored on disk storage device 31, or will be received by system computer 22 by way of a network or by reading a portable storage medium such as a tape or disk. System computer 22 can retrieve the appropriate data from disk storage device 32 to perform the desired analysis, according to program instructions corresponding to the preferred embodiment of the invention as described in detail hereinbelow and which are stored in program disk storage device 33. For operation on system computer 22, the program instructions are written in the form of computer programs in a suitable programming language and stored in computer-readable memory, such as program disk storage device 33, in source or object code form. Of course, the memory medium storing the computer program may be of any conventional type used for the storage of computer programs, including hard disk drives, floppy disks, CD-ROM disks, magnetic tape, and the like.

According to the preferred embodiment of the invention, system computer 22 presents output primarily onto graphics display 27, or alternatively via printer 28; further in the alternative, system computer 22 may store the results of the analysis described hereinbelow on disk storage device 29, for later use and further analysis. Keyboard 26 and pointing device 25 (e.g., a mouse, trackball, or the like) are provided with system computer 22 to enable interactive operation. As noted, system computer 22 is able to communicate with disk storage devices 29, 31, 33, including external hard disk storage on a network and floppy disk drives. Analysis computer system 30 is typically located at a data center that is remote from the survey region, but alternatively may be deployed in situ at the survey site, if desired.

Referring now to FIG. 3, the operation of analysis computer system 30 according to the preferred embodiment of the present invention will now be described in detail. It is contemplated that those of ordinary skill in the art having reference to this specification will be readily able to provide the necessary and appropriate programming of system computer 22 in analysis computer system 30 for performing the method that will now be described relative to FIG. 3.

The operation begins with process 32, in which system computer 22 generates a fault-enhanced seismic 3-D volume from the received seismic signals. This representation of the survey region begins with conventional filtering, common midpoint gather, normal move-out (NMO) correction, and stack operations. Fault-enhancement of the stack domain data generally refers to conventional data processing in which contrast is enhanced for signals indicative of features resulting from geological discontinuities such as those caused by subsurface faults. An example of such fault-enhanced processing is described in U.S. Pat. No. 5,563,949, incorporated herein by this reference. Other fault-enhancement processing may alternatively be performed by system computer 22 in process 32, such alternatives including dip magnitude processing, and edge detection. Further in the alternative, system computer 22 may simply receive a previously generated fault-enhanced seismic 3-D volume from another computer resource. In any case, the fault-enhanced seismic 3-D volume is stored by analysis computer system 30 in its memory, such as in disk storage device 31.

Figure 4A:
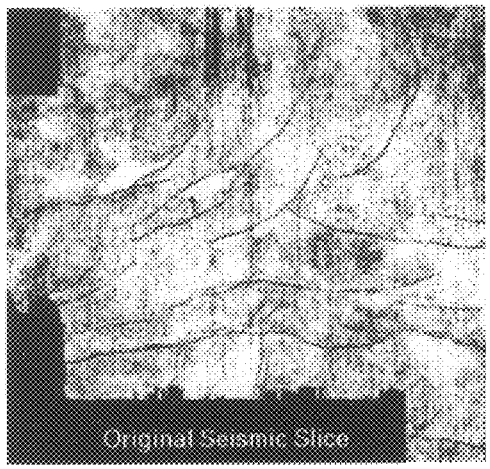
FIGS. 4a through 4f are plan view plots of a selected lateral slice in the 3-D seismic volume, illustrating the effects at various stages of the process of FIG. 3 according to the preferred embodiment of the invention.

In process 34, system computer 22 selects a first lateral slice in the fault-enhanced 3-D volume generated in process 32. This lateral slice is a planar slice that is more or less parallel to surface S (see FIG. 1), to which the depth or time dimension is normal. By way of example, FIG. 1 illustrates jth lateral slice $LS_j$ as may be initially selected in process 34. The thickness (in the depth or time dimension) of this lateral slice is preferably relatively small, such as on the order of 4 msec in the time domain, corresponding to on the order of 10 meters in typical formations. The lateral slicing of the fault-enhanced 3-D seismic volume is in a different orientation from that typically performed in seismic data processing, where cross-sections along the depth direction are commonly taken for purposes of viewing reflective surfaces. FIG. 4a illustrates a displayed image of a selected lateral slice from an actual data set, by way of example, in which potential fault indications are visible.

Process 36 is next performed by system computer 22 to filter processing noise from the selected lateral slice $LS_j$ such as may have been generated in the gather, NMO, stack, and fault-enhancement processes previously performed. It has been observed, in connection with the present invention, that striping often appears as an artifact of the acquisition and processing of the original amplitude data, such striping appearing in the vertical direction as one views the selected slice image. Referring to FIG. 4a, the presence of such vertical striping is quite evident in the illustrated selected lateral slice. While it would be readily apparent to a human analyst that such vertical striping is a processing artifact, the present invention is of course directed to the automated identification and interpretation of faults in the 3-D seismic volume. As such, it is important, relative to the present invention, that such vertical (or horizontal, as the case may be) striping artifacts be filtered in an automated manner. This automated filtering is accomplished by system computer 22 in process 36, an example of which will now be described relative to FIG. 5.

According to the preferred embodiment of the invention, process 36 begins with process 48, in which a contrast stretch is applied to the image data for the selected lateral slice $LS_j$. Typically, digital values for images after processes 32, 34 are compressed into a relatively small portion of the available dynamic range. For example, image values within a range of $128_{10}$ to $255_{10}$ for eight-bit values are typically encountered. In process 36, system computer 22 transforms these compressed values to cover the full eight-bit dynamic range from $0_{10}$ to $255_{10}$, thus improving the contrast and resolution of the image data.

Decision 49 next determines if any striping that does appear after contrast stretch process is vertical or horizontal. If vertical striping is present (decision 49 is YES), process 50 is then next performed by system computer 22 to rotate the image 90° prior to applying the filtering operations. This rotation of process 50 may be simply performed by swapping the orientation of the indices of the 2-D representation, rather than by reading and rewriting the entire dataset of lateral slice $LS_j$.

Upon completion of process 50, or if no vertical striping is present (decision 49 is NO), system computer 22 next performs process 52 to select a first pixel of interest in the rotated image of lateral slice $LS_j$, along with a window of pixels surrounding the pixel of interest. FIG. 6 illustrates an exemplary window W of pixels, centered about pixel of interest POI. In this example, window W includes five rows of pixels, $R_{i-2}$ to $R_{i+2}$, where row $R_i$ is the row containing pixel of interest POI. The size of window W will, of course, vary with the nature of the artifacts typically encountered and with the available computing capacity; an example of a suitable window W is five rows R, each having forty-five pixels. This aspect ratio of window W is preferable to eliminate stripes that will be horizontal in the rotated image of lateral slice $LS_j$.

After selection of window W and pixel of interest POI, system computer 22 performs process 54 by computing the average (mean) image intensity for each row R of pixels.

System computer 22 then determines the median of these average row intensities. In process 56, system computer 22 adjusts the intensity of pixel of interest POI by subtracting the average intensity for its row $R_i$, and then adding to this difference the median row average determined in process 54. Adjusted pixel intensity $POI_{adj}$ from process 56 may thus be expressed as follows:

$$POI_{adj}=(POI_{raw}-AVGR_i)+MEDAVGR$$

where $POI_{raw}$ is the intensity of pixel of interest POI after contrast stretch process 48, where $AVGR_i$ is the mean intensity for pixels in row $R_i$ which contains pixel of interest POI, and where MEDAVGR is the median of the mean intensities, taken by row, over window W. One may thus readily see that process 56 adjusts the intensity of pixel of interest POI to a value that represents its differential from the other pixels in its row $R_i$, offset from the median row intensity rather than from its own average row intensity. As a result, if pixel of interest POI happens to be within a stripe artifact, the portion of its intensity that is due to the artifact (which presumably applies to all pixels in its row $R_i$) is replaced by the median intensity over the window. Accordingly, single pixel-wide stripes are quite effectively eliminated in process 36.

Referring back to FIG. 5, decision 57 then determines if additional pixels of interest remain to be processed; if so (decision 57 is YES), the pixel index is incremented in process 58, and processes 52, 54, 56 are then repeated for the next pixel. Upon completion of process 36 for all of the pixels in lateral slice $LS_j$, system computer 22 rotates the image $-90°$ in process 59, in effect returning lateral slice $LS_j$ to its original orientation.

Figure 4B:
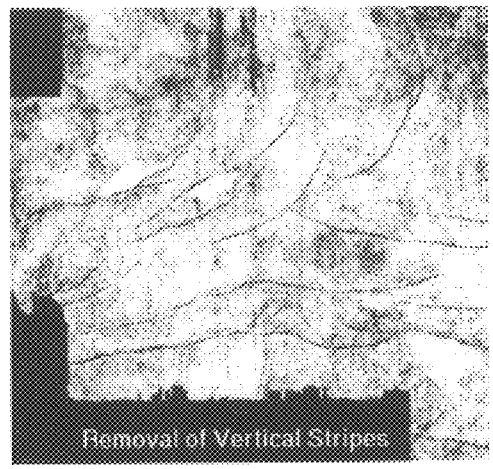

FIG. 4b illustrates an example of the result of filtering process 36 according to the preferred embodiment of the invention. Comparison of FIG. 4b to FIG. 4a readily illustrates that a significant number and amplitude of vertical striping artifacts are eliminated by the performing of process 36 as described hereinabove. This artifact removal thus greatly assists the accuracy with which the remaining steps in the process can identify faults, as will now be described.

Figure 7:
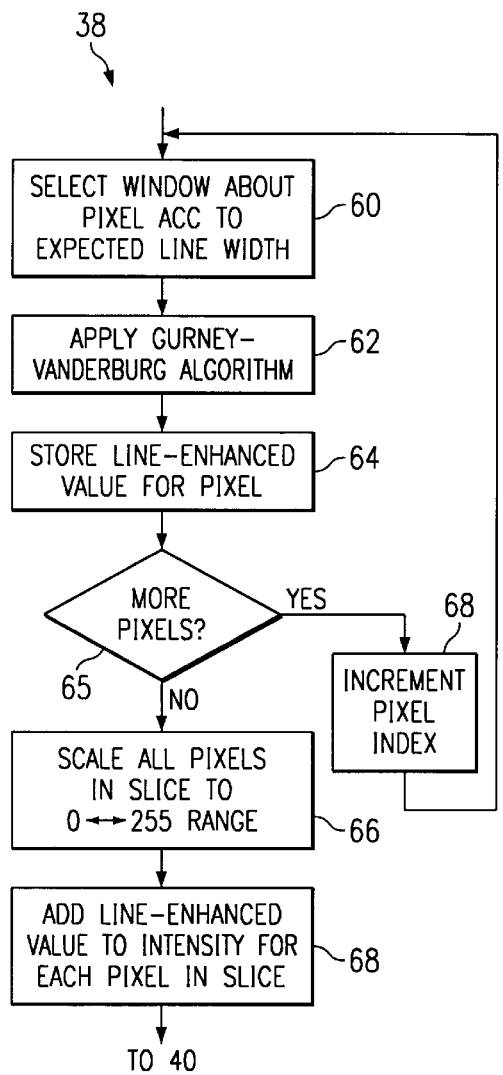
FIG. 7 is a flow diagram illustrating the operation of the line enhancement process in the process of FIG. 3 according to the preferred embodiment of the invention.

Referring back to FIG. 3, upon completion of filtering process 36, analysis computer system 30 next performs process 38 upon the selected lateral slice $LS_j$. In process 38, system computer 22 enhances linear features that are present in the selected lateral slice $LS_j$, as will now be described relative to FIG. 7.

Process 38 begins with system computer 22 selecting a set of windows about a pixel of interest. In process 38, the size of each window in the set is selected to be five times a previously determined expected width of a line that corresponds to a fault in the 3-D seismic volume. Of course, this determination depends upon the pixel resolution used in the representation of the volume. For example, according to one implementation of the preferred embodiment of the invention, fault lines are typically three pixels wide. As such, each window in the set of windows selected in process 38 will be fifteen pixels wide. For purposes of line enhancement, each window in the set of windows will be considered as twenty-five equally sized blocks that are centered about the pixel of interest, as will now be described relative to FIG. 8.

Figure 8:
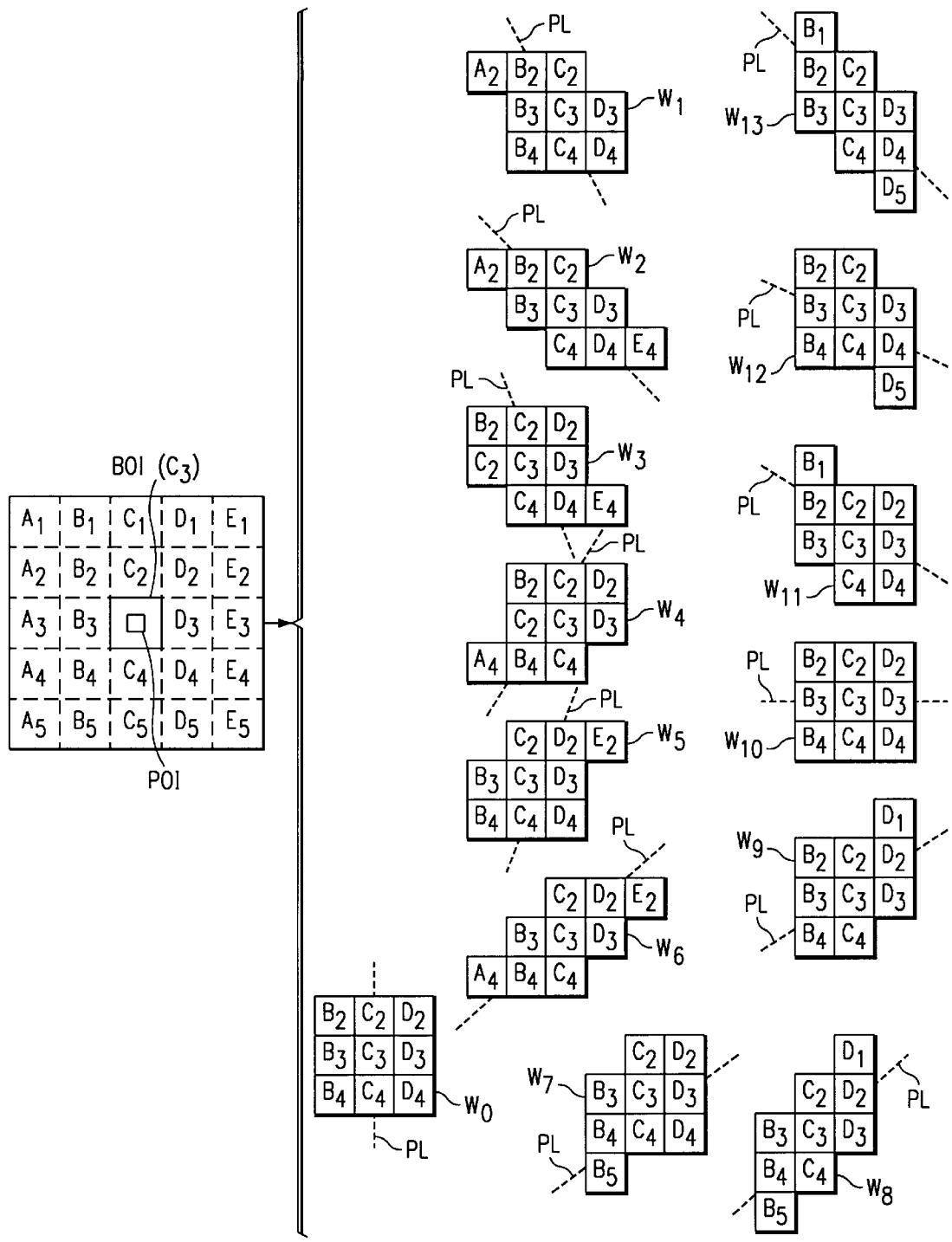
FIG. 8 illustrates image windows as used in the line enhancement process of FIG. 7 according to the preferred embodiment of the invention.

FIG. 8 illustrates a set of windows $W_0$ through $W_{13}$ of varying orientation that are centered about pixel of interest POI that is within block of interest BOI. These windows are each based upon the expanded view illustrated in FIG. 8 of twenty-five blocks $A_1$ through $A_5$, $B_1$ through $B_5$, and $C_1$ through $C_5$, arranged in a square orientation. Each of blocks A, B, C, D, E are three pixels square. In this example, pixel of interest POI is in the center of block $C_3$ (which is the block of interest BOI in this example), below block $C_2$ and above block $C_4$. Windows $W_0$ through $W_{13}$ are fourteen arrangements of blocks A, B, C, D, E, each of which are centered about block $C_3$ and thus about pixel of interest POI, but which may be skewed to the left, to the right, up, or down; windows $W_0$ and $W_{10}$ are square blocks centered about block $C_3$. The orientation of the potential line containing center block $C_3$ is indicated in each window W by the dashed line PL. Windows $W_0$ through $W_6$ are used for primarily vertical potential lines PL, while windows $W_7$ through $W_{13}$ analyze primarily horizontal potential lines PL. Each of windows $W_0$ through $W_{13}$ are used in performing line-enhancement process 38, as will now be described.

Referring back to FIG. 7, process 64 is next performed by system computer 22 executing a line enhancement algorithm. According to the preferred embodiment of the present invention, line enhancement process 62 is performed in a manner that is described in detail in Gurney, "Threshold Selection for Line Detection Algorithms", *Transactions on Geoscience and Remote Sensing*, Vol. GE-18, No. 2 (IEEE, April, 1980), pp. 204–211, and in Vanderburg, "Line Detection in Satellite Imagery", *Transactions on Geoscience and Remote Sensing*, Vol. GE-14, No. 1 (IEEE, January, 1976), pp. 37–44, both incorporated herein by this reference. According to the preferred embodiment of the present invention, each of windows $W_0$ through $W_{13}$ of blocks A, B, C, D, E are analyzed according to a semilinear detector, in which the extent to which block $C_3$ (centered about the pixel of interest POI) is part of a line is found by comparing the intensity data of a potential line of blocks containing block $C_3$ versus those of blocks on either side of the potential line. In this example, the intensity data are considered by averages of the pixels within each of blocks.

For example, consider window $W_1$ of FIG. 8. In this example, the potential line of blocks containing block $C_3$ includes blocks $B_2$ and $C_4$; this potential line is compared against the line of blocks $A_2 B_3$, $B_4$ on one side, and against the line of blocks $C_2$, $D_3$, $C_4$ on the other side. In this example, block $C_3$ is considered to be within a part of a (dark) line in window $W_1$, if:

$$(A_2+B_3+B_4)>(B_2+C_3+C_4)<(C_2+D_3+D_4)$$

Similar analysis is performed for each of the other windows $W_0$, and $W_2$ through $W_{13}$, in which the block intensities are analyzed according to the position of the potential lines therein. According to the preferred embodiment of the invention, a numerical value $L_k$ is determined for pixel of interest POI within each window $W_k$, depending upon the degree to which its surrounding block of interest (BOI) $C_3$ is found to be within a line, considering all the fourteen windows $W_0$ through $W_{13}$. For a given window $W_k$, the numerical value $L_k$ is derived as the sum of the differences between the potential line through block $C_3$ and the neighboring blocks. For the above example of window $W_1$, the numerical value $L_1$ may be determined as:

$$L_1=((A_2+B_3+B_4)-(B_2+C_3+C_4))+((C_2+D_3+D_4)-(B_2+C_3+C_4))$$

Maximum numerical value $MAXL_k$ is simply the maximum difference value, over windows $W_0$ through $W_{13}$, by way of which the potential line containing block $C_3$ is darker than its neighboring lines within the particular window W. Process 64 is next performed by system computer 22, in which numerical value $MAXL_k$ is stored in memory of analysis computer system 30, in association with the current pixel of interest POI. Decision 65 is next performed by system computer 22 determining if more pixels remain to be processed. If so (decision 65 is YES), control passes to process 68 in which the pixel index is incremented, and after which processes 60, 62, 64, are repeated for the next pixel of interest POI.

Upon completion of process 64 for each of the pixels in the current lateral slice $LS_j$ (decision 65 is NO), process 66 is next performed by system computer 22 to scale all pixels in the current slice $LS_j$. according to the available dynamic range, e.g., from $0_{10}$ to $255_{10}$ where eight-bit values are used. Rescaling process 66 preferably eliminates outlying values by setting the maximum intensity value (255) to the intensity of the $99^{th}$ percentile pixel intensity, and the minimum intensity value (0) to the $1^{st}$ percentile pixel intensity. Pixels with intensity values $POI_{adj}$ above the $99^{th}$ percentile intensity are set to the maximum value, and pixels with intensity values below the $1^{st}$ percentile intensity are set to the minimum value. Pixels with an intensity value $POI_{adj}$ between the $1^{st}$ and $99^{th}$ percentile intensities are scaled to a value $POI_{sc}$ as follows:

$$POI_{sc} = \frac{255(POI_{adj} - POI_{min})}{POI_{max} - POI_{min}}$$

where $POI_{max}$ and $POI_{min}$ are the maximum and minimum pixel intensity values in the current slice $LS_j$.

After rescaling process 66, system computer 22 next performs process 68 to convert the scaled pixel intensity value $POI_{sc}$ for each pixel using the numerical value $L_k$ derived in process 62 and stored in process 64, to provide a line-enhanced value $POI_{le}$. If not already in this form, process 68 first inverts the intensity value (by subtraction from 255), in this example which illustrates dark lines on a light background (rather than vice versa). The line-enhanced value of $POI_{le}$ is then derived according to the expression:

$$POI_{le} = 255 - [a \cdot POI_{sc} + b \cdot MAXL_k]$$

where a and b are weighting constants, which may be empirically determined.

Figure 4C:
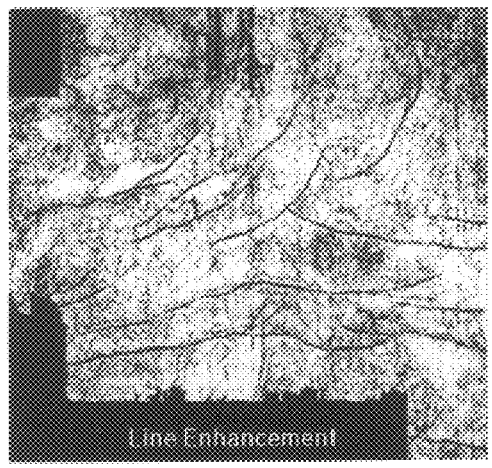

FIG. 4c illustrates an example of the application of process 38 on a lateral slice $LS_j$ of an actual 3-D seismic volume. In this example, line enhancement process 38 was applied to the image of FIG. 4b, using unity as the value for weighting constant a, and 0.4 for the value of weighting constant b. As is clearly shown in FIG. 4c, line features are significantly enhanced relative to FIG. 4b.

Following the performing of process 68 for each pixel in the current slice $LS_j$, control passes to line detection process 40, performed by analysis computer system 30 according to the preferred embodiment of the invention. As will become apparent from the following description, line detection process 40 is directed to analyzing the line-enhanced version of the selected lateral slice $LS_j$, to determine the relationship among pixels therewithin. In particular, as will be described hereinbelow, process 40 will associate a vector with each pixel, the amplitude of which is indicative of the extent to which the pixel is associated with a line, and the direction of which indicates the direction of an adjacent pixel in that associated line. The detailed description of line detection process 40 according to the preferred embodiment of the invention will now be described relative to FIG. 9.

System computer 22 initiates process 40 by again rescaling the $POI_{le}$ values from process 38, to cover the available dynamic range, as before. As is known in the art, conventional seismic 3-D volumes are displayed in a fashion where positive amplitude is displayed as a filled sinusoidal half-cycle, and as such high amplitude is indicated by a dark region in a monochrome display. It is preferable, according to this embodiment of the invention, to operate upon intensity or brightness values for purposes of line detection, and as such process 69 may also invert (or re-invert, as the case may be) the line-enhanced darkness values for each pixel in lateral slice $LS_j$, simply by subtraction of the darkness value from the maximum (which is $255_{10}$, for an eight-bit representation).

Figure 10:
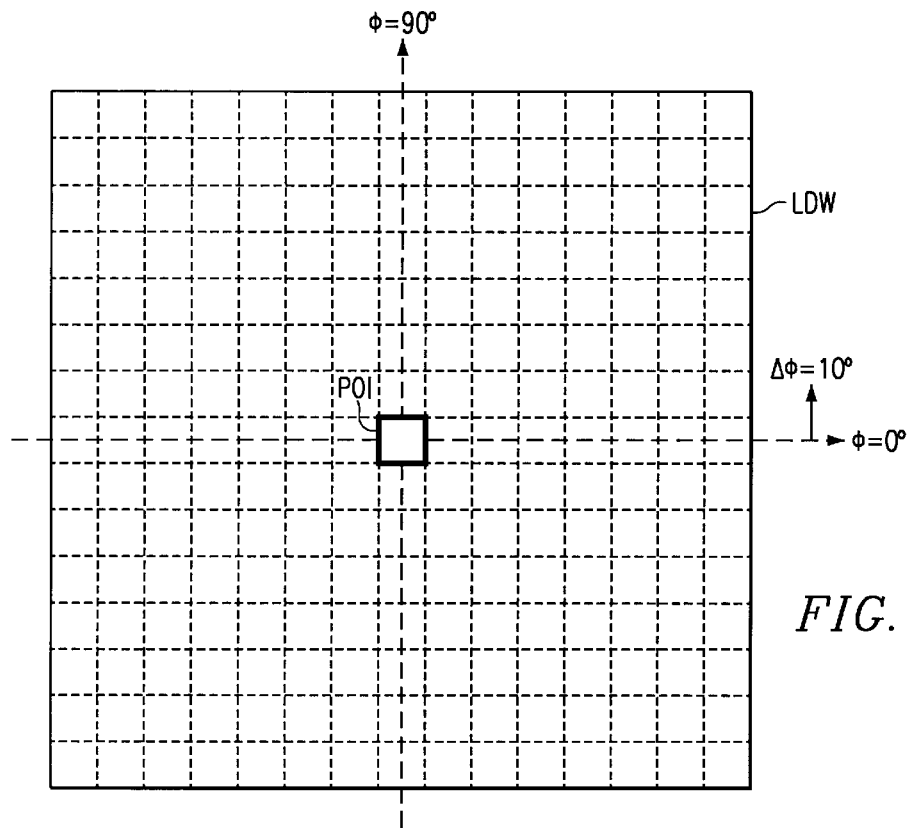
FIG. 10 is an image window as used in the line detection process of FIG. 9.

In process 70, system computer 22 selects a pixel of interest POI in lateral slice $LS_j$, and a window LDW surrounding this pixel of interest POI. According to this embodiment of the invention, the window LDW should be sufficiently large as to provide some differential in pixel populations therewithin for each of a plurality of relatively-closely spaced angles. FIG. 10 illustrates an exemplary window LDW which, in this example, is arranged as a square with fifteen pixels on a side, centered about pixel of interest POI. In this embodiment of the invention, potential lines will be considered at each of multiple angles φ, varying at relatively close spacing such as 10°. The fifteen-by-fifteen window LDW permits the population of pixels therewithin to vary from angle-to-angle, thus providing good resolution in line identification process 40, as will now be described.

In process 71, system computer 22 sums the intensity values of each pixel in window LDW (including pixel of interest POI) that resides along a line in a first direction φ, for example 0°. This summing is a simple summation of the brightness, or intensity, of each pixel intersected by an imaginary line through window LDW and passing through pixel of interest POI at the angle φ. Of course, system computer 22 will perform this summation in a preprogrammed manner, with the pixels to be summed in each iteration determined by their position in window LDW relative to pixel of interest POI. After determining and storing the sum at selected angle φ (in process 72), decision 73 determines if additional angles φ remain to be summed by process 71; if so (decision 73 is YES), an index for angle φ is incremented in process 74, and processes 71, 72 are performed for the next angle φ. Processes 71, 72 are repeated for each desired angle φ; for example, if the differential Δφ between angles φ is 10°, processes 71, 72 will be performed eighteen times to provide full coverage of window LDW.

Upon completion of processes 71, 72 for all desired angles φ (decision 73 is NO), system computer 22 next performs process 76 to identify the minimum $\Sigma POI_{le}$ and maximum $\Sigma POI_{le}$ determined in the series of processes 71, 72; in addition, process 76 identifies the angles $\phi_{min}$, $\phi_{max}$ associated with the minimum and maximum sums, respectively.

In process 77, system computer 22 then determines the difference between the minimum and maximum sums found in process 76, to derive an amplitude $\Delta_L$ and direction $\phi_L$ for pixel of interest POI. The value of amplitude $\Delta_L$ corresponds to the extent to which pixel of interest POI is associated with a line; for example, a low value of amplitude $\Delta_L$ indicates that pixel of interest POI is probably not associated with a line, while a high value of amplitude $\Delta_L$ indicates that pixel of interest POI is likely to be associated with a line. The direction $\phi_L$ is simply the one of angles φ at which the maximum $\Sigma POI_{le}$ occurs.

The determination of amplitude $\Delta_L$ may be made according to any one of a number of alternative approaches. According to the preferred embodiment of the invention, amplitude $\Delta_L$ is derived by comparing the absolute value of the difference between maximum and minimum sums as determined in process 77. The amplitude $\Delta_L$ may thus be derived as follows:

$$\Delta_L = \max\left[\sum_\phi POI_{le}\right] - \min\left[\sum_\phi POI_{le}\right]$$

where $$\sum_\phi POI_{le}$$

is the sum of the line-enhanced pixel intensities (inverted for brightness) at an angle $\phi$, where $$\min\left[\sum_\phi POI_{le}\right]$$

is the minimum one of such sums, and where $$\max\left[\sum_\phi POI_{le}\right]$$

is, of course, the maximum of such sums.

Because this preferred embodiment of the invention is concerned with detecting faults, it is important that any high values for amplitude $\Delta_L$ be associated with true lines (i.e., linear arrangements of bright pixels, with relatively dark pixels on both sides thereof, and not edges (a linear edge of a region of bright pixels). Edges may be indicative of strata or other regions, including the edge of the survey itself, and as such edge discontinuities are considered as noise according to this embodiment of the invention. Therefore, system computer 22 next performs process 78 in which edges are detected from the current window LDW for pixel of interest POI and amplitude $\Delta_L$ is adjusted in that regard, as will now be described.

Figure 11:
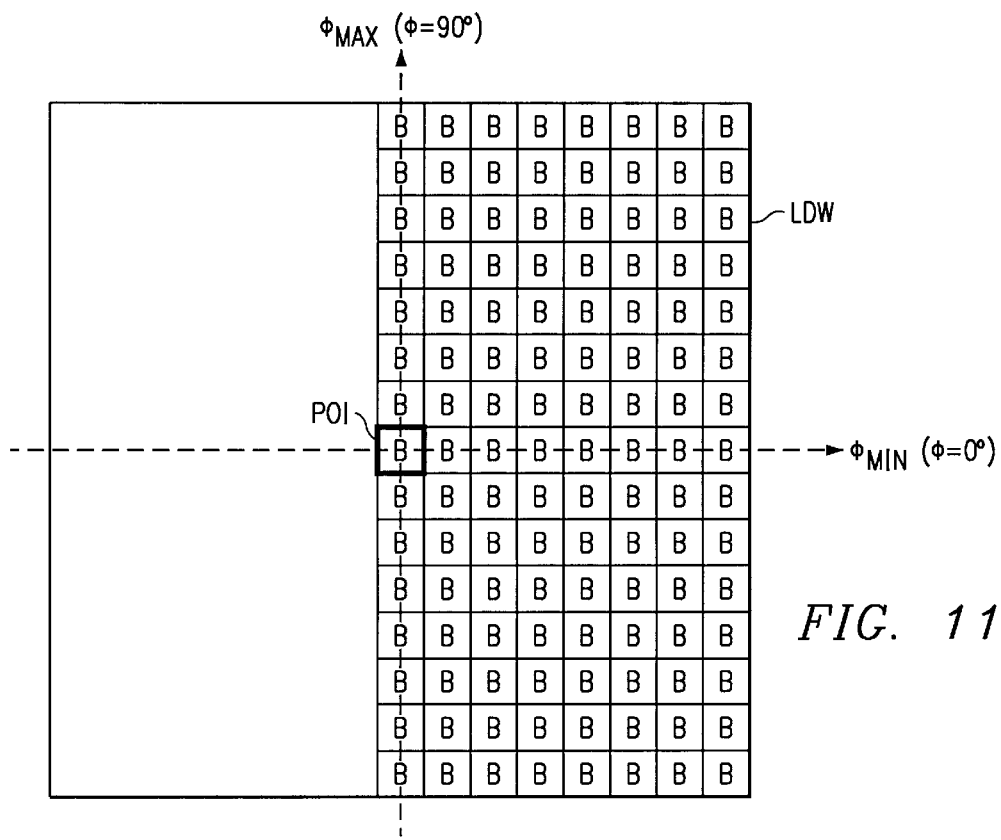
FIG. 11 is an image window illustrating an example of the edge detection process in the process of FIG. 9 according to the preferred embodiment of the invention.

FIG. 11 illustrates an exemplary window LDW in which an edge of a bright region is present. In FIG. 11, bright (i.e., high intensity) pixels are indicated by the "B" characters, and are present in a half-plane to the right of pixel of interest POI, including pixel of interest POI. In this example, a bright line would be considered as the vertical line ($\phi=90°$) through pixel of interest POI, as this line would be significantly different from the minimum line at $\phi=0°$; however, this line is not truly a line in the fault context, but is instead an artifact of the edge of the bright region to its right.

Figure 12:
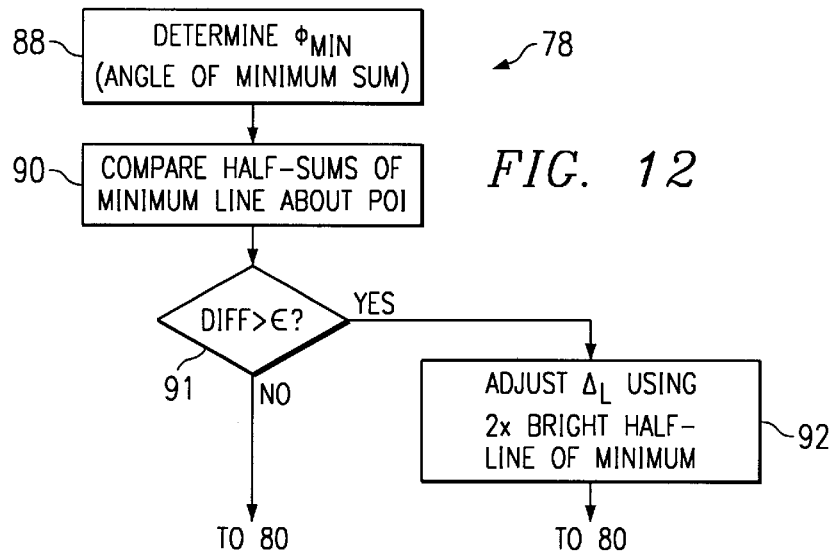
FIG. 12 is a flow diagram illustrating the operation of the process of edge detection illustrated relative to the example of FIG. 11 according to the preferred embodiment of the invention.

In process 78, referring now to FIG. 12, edges of bright regions such as illustrated in FIG. 11 are detected. System computer 22 initiates process 78 by first retrieving, in process 88, the angle $\phi_{min}$ of the minimum sum as determined in process 76. In the example of FIG. 11, this minimum angle $\phi_{min}$ is 0° (as only half of the line is bright, and the other half is dim, and as such this angle includes the fewest bright pixels). In process 90, the line associated with angle $\phi_{min}$ is divided into two portions, one on either side of pixel of interest POI, and sums are derived for these two portions. Also in process 90, system computer 22 determines the difference between these two half-sums and, in decision 91, compares this difference with a preselected threshold $\epsilon$. If the difference exceeds this threshold $\epsilon$ (decision 91 is YES), system computer 22 concludes that the detected line is an edge rather than a true line, and control passes to process 92. For example, in the example of FIG. 11, one half-sum for the line at $\phi=0°$ would have all bright pixels B, and the other half-sum would have all dark pixels, in which case the difference between the two half-sums would be greater than any threshold $\epsilon$ (sum of all bright pixels versus all dim pixels). Alternatively, if the difference in half-sums for the minimum line is below this threshold $\epsilon$ (decision 91 is NO), no adjustment is necessary, and control passes to process 80.

For edges detected by process 90 and decision 91, amplitude $\Delta_L$ is adjusted to downgrade the edge effects. This downgrading may be performed by any one of multiple techniques, including simply setting amplitude $\Delta_L$ to a low value. According to the preferred embodiment of the present invention, adjustment process 92 is performed in a qualitative manner. In process 92, the minimum is adjusted to be twice the sum of the pixels in the brighter half-line of the minimum line, effectively adjusting the minimum line to include the brighter half-plane of window LDW, which will necessarily reduce the difference between the maximum and minimum components of the amplitude $\Delta_L$. Following adjustment process 92, control passes to process 80 of FIG. 9.

Figure 13:
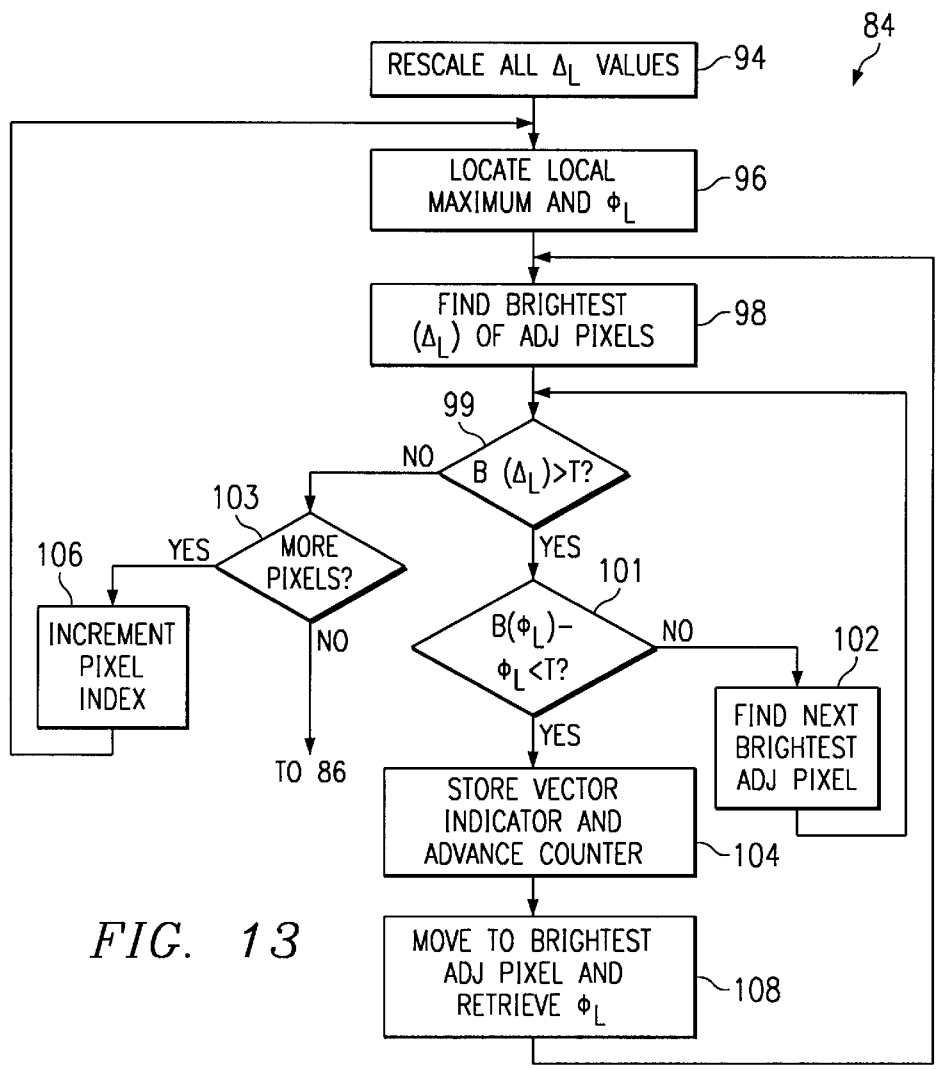
FIG. 13 is a flow diagram illustrating the operation of the vectorization process in the process of FIG. 3 according to the preferred embodiment of the invention.

In process 80, system computer 22 stores amplitude $\Delta_L$ and direction $\phi_L$ for pixel of interest POI in memory, in association with the coordinates of pixel of interest POI within lateral slice $LS_j$. Decision 81 is then performed by system computer 22, to determine if additional pixels remain to be processed in process 40; if so (decision 81 is YES), control passes to process 82 by way of which the appropriate pixel index is incremented. Processes 70 through 80 are then repeated for the next pixel in lateral slice $LS_j$. Upon completion of processes 70 through 80 for all pixels in lateral slice $LS_j$ (decision 81 is NO), system computer 22 then initiates line tracing process 84, as will now be described relative to FIG. 13.

Figure 14A:
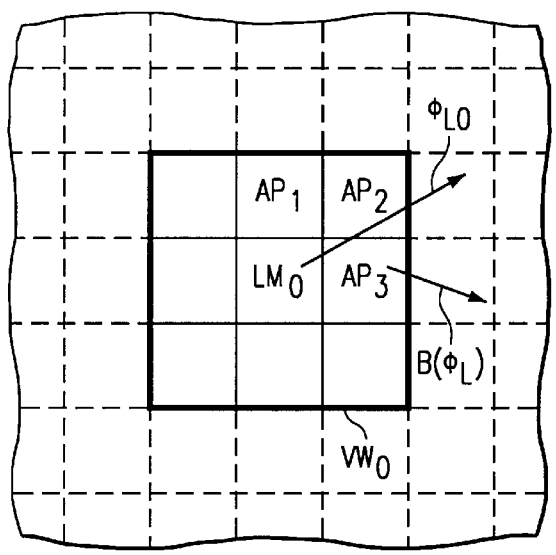
FIGS. 14a and 14b are image windows illustrating an example of the vectorization process of FIG. 13.

According to the preferred embodiment of the present invention, process 84 begins with system computer 22 first rescaling the values of amplitude $\Delta_L$ according to the available dynamic range. For example, rescaling the values of amplitude $\Delta_L$ to a range from $0_{10}$ to $255_{10}$ is suitable for use where eight-bit values are to be used. Process 96 is then performed by system computer 22 to identify a local maximum for the value of amplitude $\Delta_L$. According to the preferred embodiment of the present invention, a local maximum of the value of amplitude $\Delta_L$ is defined as a pixel that, when centered within a window of selected size, has the maximum value of amplitude $\Delta_L$. An example of process 96 is illustrated in FIG. 14a, where a three-by-three pixel window $VW_0$ is illustrated, having local maximum $LM_0$ at the center thereof; as defined above, local maximum pixel $LM_0$ has the maximum value of amplitude $\Delta_L$ of the nine pixels within pixel window $VW_0$. Local maximum pixel $LM_0$ has a direction $\phi_{L0}$ associated therewith, as shown.

Once system computer 22 locates local maximum $LM_0$ and its direction $\phi_{L0}$, system computer 22 next performs process 98 to identify the brightest (in value of amplitude $\Delta_L$) of the set of adjacent pixels that lie upon an imaginary line along the direction $\phi_{L0}$ or are adjacent to such a pixel. In the example of FIG. 14a, adjacent pixel $AP_2$ lies in the direction $\phi_{L0}$ from local maximum $LM_0$, and adjacent pixels AP1, AP3 lie on either side of pixel $AP_2$. In this example, system computer 22 will retrieve the amplitudes $\Delta_L$ for pixels $AP_1$, $AP_2$, $AP_3$, and decide which of these three pixels has the largest amplitude $\Delta_L$; this largest amplitude will be referred to as $B(\Delta_L)$.

Figure 9:
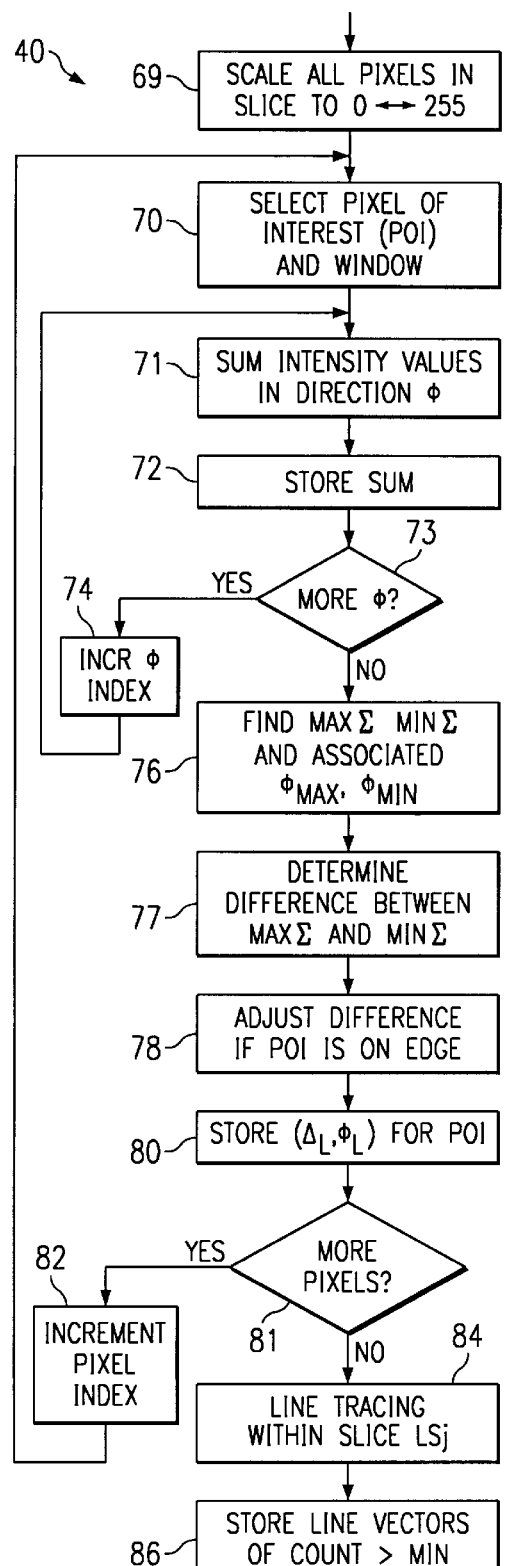
FIG. 9 is a flow diagram illustrating the line detection process in the process of FIG. 3 according to the preferred embodiment of the invention.

Decision 99 is then performed by system computer 22, to compare the amplitude $B(\Delta_L)$ of this selected adjacent pixel to a preselected threshold value T. If this amplitude $B(\Delta_L)$ does not exceed this threshold (decision 99 is NO), no line extends beyond pixel $LM_0$. Decision 103 is then performed by system computer 22 to determine if more pixels remain to be processed; if so (decision 103 is YES), the pixel index is incremented in process 106, and process 84 is repeated to find the next local maximum. If no more pixels remain (decision 103 is NO), process 84 is complete and control passes to process 86 (FIG. 9).

If the amplitude $B(\Delta_L)$ does exceed the threshold T (decision 99 is YES), a line may extend beyond pixel $LM_0$ to the brightest adjacent pixel. Decision 101 is then performed to determine whether the direction $B(\phi_L)$ associated with this brightest adjacent pixel is within a preselected range of the direction $\phi_{L0}$ of local maximum pixel $LM_0$. If decision 101 is NO, the line does not extend to this brightest adjacent pixel (or local maximum $LM_0$ may correspond to a "saddle" point at the intersection of multiple lines), and control passes to decision 102 to identify the next brightest adjacent pixel, following which decisions 99, 101, 103 are again performed as appropriate. If decision 101 is YES, the line does indeed extend to the next brightest pixel, and control passes to process 104.

In process 104, system computer 22 stores a vector indicator corresponding to the pixel of interest $(LM_0)$; this vector indicator includes an index value for this line, and a count of the number of pixels in the line so far. System computer 22 then advances to process 108, where the brightest adjacent pixel is now considered as a "local maximum" for purposes of another pass through process 84. The process is then repeated beginning from process 98, as described above.

Figure 14B:
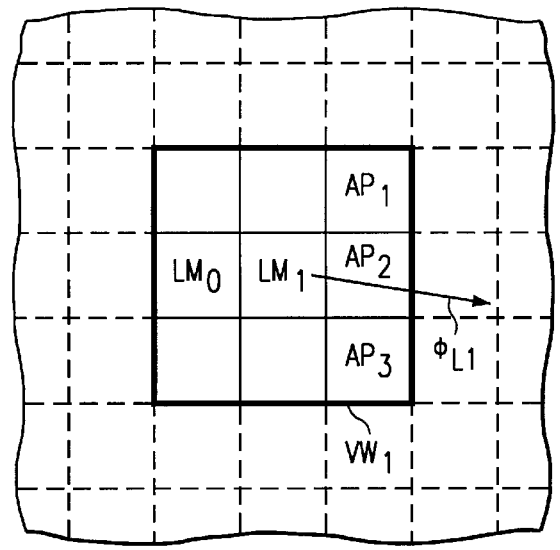

By way of example, referring to FIGS. 14a and 14b, consider the example where pixel $AP_3$ is the brightest adjacent pixel to the first local maximum $LM_0$. If the amplitude $B(\Delta_L)$ is above the amplitude threshold (decision 99 is YES) and if direction $B(\phi_L)$ associated with pixel $AP_3$ is within the threshold angle relative to direction $\Delta_{L0}$ of local maximum $LM_0$ (decision 101 is YES), pixel $AP_3$ is considered to be on the same line as local maximum pixel $LM_0$. As shown in FIG. 14b, process 108 now considers pixel $AP_3$ from FIG. 14a as the new local maximum $(LM_1)$, and centers window $VW_1$ thereabout. Process 98 is then performed, where new adjacent pixels $AP_1$, $AP_2$, $AP_3$ are now considered, as these pixels are on or either side of the direction $\phi_{L1}$.

Referring back to FIG. 9, upon completion of process 84, process 86 is now performed by system computer 22 to store the vector indicators from processes 104. According to the preferred embodiment of the invention, process 86 discriminates among the detected lines by only considering those lines that have a minimum length. While it is possible that small faults (and small features of faults) may be missed by ifhaving a threshold that is too large, it is useful from the standpoint of additional processing and surface generation to eliminate as much noise (i.e., false lines of short length) as can be afforded. By way of example, a threshold length of fifty pixels has been used, and provides reasonable interpretation and analysis when used in connection with the present invention. Upon completion of storage process 86, line detection process 40 is complete.

Figure 4D:
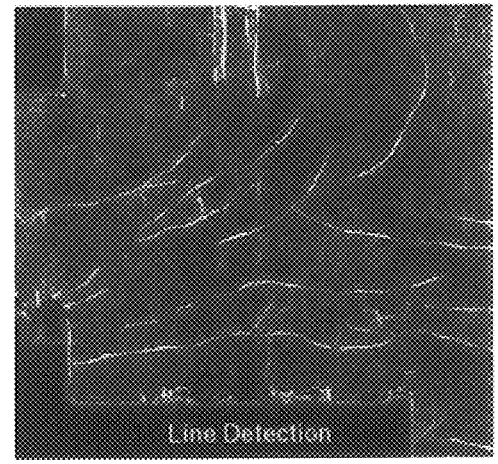
Figure 4E:
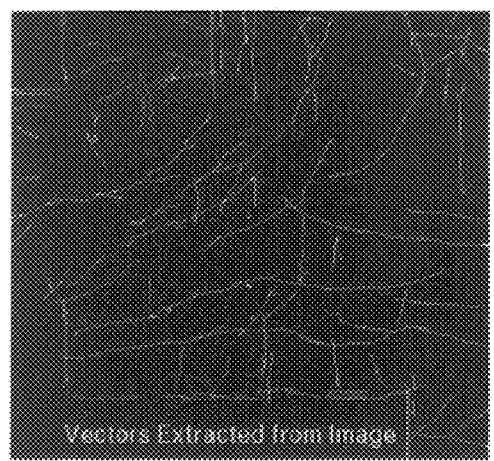

FIGS. 4d and 4e illustrate the results from an exemplary implementation of the preferred embodiment of the invention, after the completion of process 40. In FIG. 4d, images of the detected lines in the lateral slice illustrated in FIG. 4c are illustrated, where dark lines in FIG. 4c are now displayed as bright lines. FIG. 4e illustrates these detected lines from their vector data as generated in storage process 86, and thus corresponds to the vector output from process 40.

Referring back to FIG. 3, decision 41 is now performed by system computer 22 to determine if more lateral slices LS remain to be processed. If so (decision 41 is YES), the lateral slice index j is incremented in process 42, and the process is repeated for the next lateral slice $LS_j$ in the seismic volume, beginning with process 34. If all slices have been processed into vector form (decision 41 is NO), control passes to process 44 in which analysis computer system 30 links the vector information into surfaces.

Figure 4F:
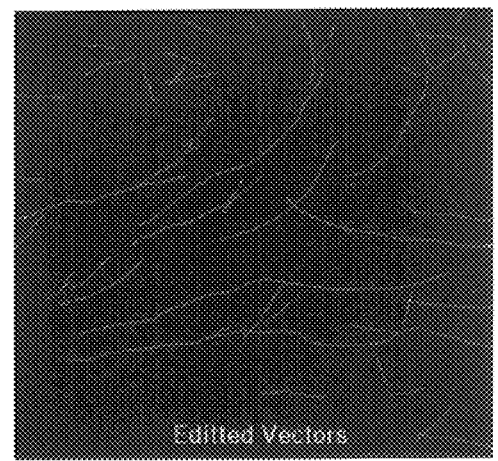

Prior to process 44, it is useful to undertake some amount of editing of the vector files. This editing may be done manually by a human analyst, or alternatively in an automated fashion according to a rule-based or other image analysis system. This editing generally deals with the elimination of vertical artifacts that may still remain despite the filtering of process 36, and with the elimination of edges of the seismic volume by applying a mask derived from the original dataset boundaries. In addition, nearby vectors that are not fully linked but which have similar azimuths may be linked in this editing process, and stubs of overlapping vectors may be eliminated. An example of this editing process is illustrated in FIG. 4f which, by way of comparison with FIG. 4e, clearly shows a cleaner set of potential faults.

Figure 15:
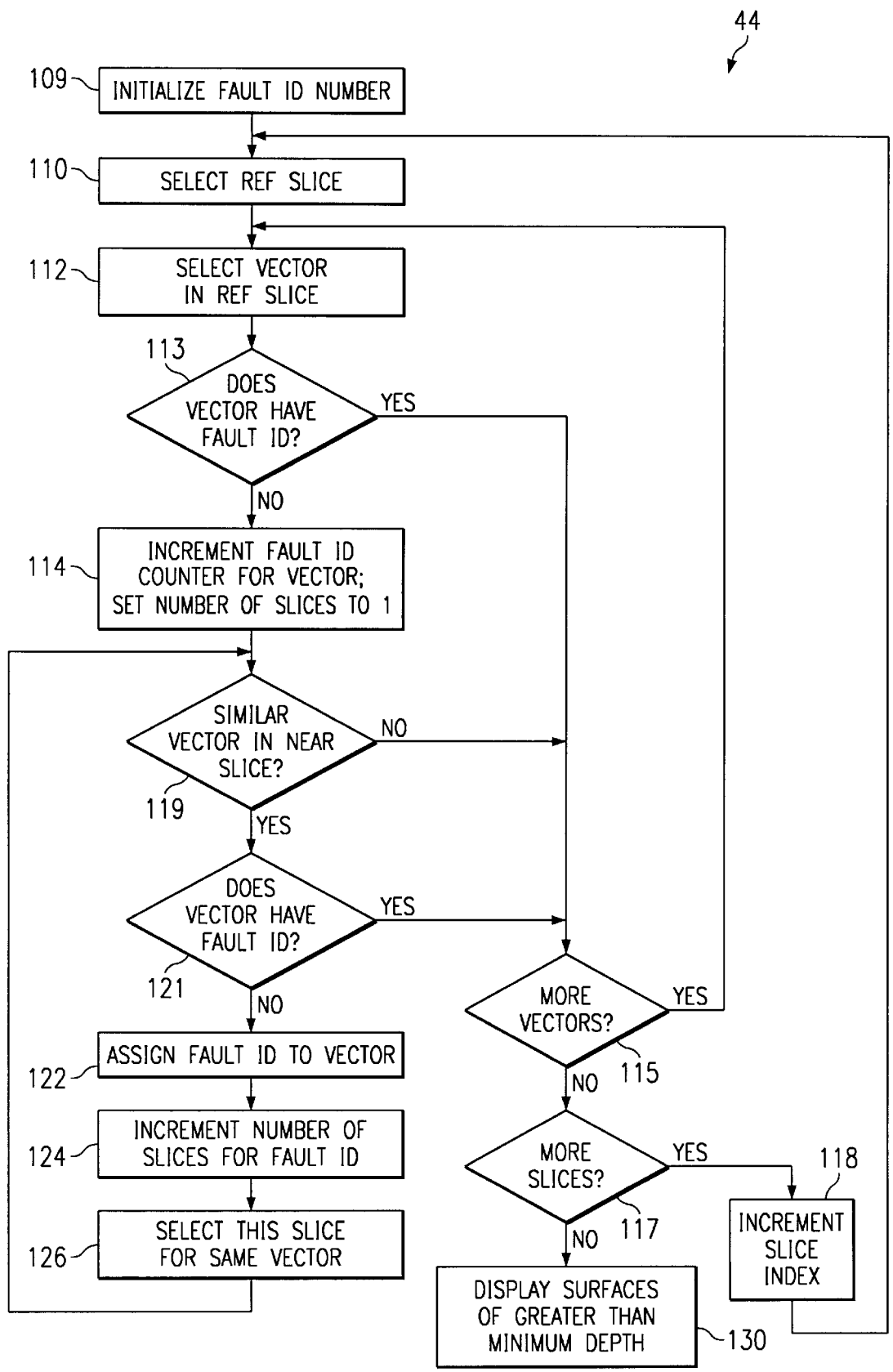
FIG. 15 is a flow diagram illustrating the operation of the vector linking process in the process of FIG. 3 according to the preferred embodiment of the invention.

Following any necessary editing, process 44 is now performed by system computer 22 to link the vector information into interpreted fault surfaces, as will now be described relative to FIG. 15. System computer 22 first, in process 109, initializes a fault ID number, which will be used to identify a specific fault surface. In process 110, system computer 22 then selects a reference slice within the volume, each slice of course including vector information regarding length and azimuth for each line detected and remaining after process 40. In process 112, system computer 22 selects a first vector in this reference slice for analysis.

In decision 113, system computer 22 interrogates the selected vector to determine if a fault ID has been previously assigned to this vector. If the current vector does not have a fault ID already assigned thereto (decision 113 is NO), then this vector has not yet been analyzed to determine if it is part of a fault surface, and process 114 is then performed to increment a fault ID counter for this vector, and to set a number of slices associated with the fault ID number to the value of one (this vector being the first vector associated with this fault surface). Control then passes to decision 119.

In decision 119, system computer 22 determines if a similar vector is present in neighboring slices. For example, decision 119 may be performed by system computer 22 interrogating vector information in slices that are within up to ten slices on either side of the reference slice, to determine if a similar vector in azimuth and horizontal position is present in any one of these neighboring slices in approximately the same area location. If not (decision 119 is NO), the current vector is not deemed to be part of a surface, and control passes to decision 115 to determine if additional vectors (and, eventually, slices) remain to be analyzed, as discussed above.

If one or more of the nearby slices includes a similar vector (decision 119 is YES), system computer 22 maintains the vector information in the dataset, and proceeds to decision 121 to determine if the similar vector, in the nearby slice, has a fault ID. If so (decision 121 is YES; i.e., this similar vector has already been identified to be part of a fault surface), control passes to decision 115 to move onto the next vector. However, if this similar vector in the nearby slice does not have a fault ID number (decision 121 is NO), then process 122 is performed by system computer 22 to assign the current fault ID number to this vector in the nearby slice, and process 124 increments the counter which maintains a count of the number of slices associated with this fault ID number. In process 126, system computer then selects the slice associated with this vector for use as the reference vector, prior to repeating decision 119 to determine if a nearby slice to this new slice includes a similar vector.

Referring back to the path of decisions 115, 117, if processing is completed such that more slices remain to be analyzed (decision 117 is YES), the next slice for processing is selected after the incrementing of the slice index in process 118, as noted above. Upon retrieval of the next slice, some vectors may already have fault ID numbers assigned because these vectors are similar to vectors in a nearby, previously analyzed, slice; other vectors in this new slice, of course, will not have fault ID numbers assigned. As such, when process 112 is performed to select a vector and if decision 113 determines that the selected vector does not have a fault ID associated therewith, process 114 will increment the fault ID value and assign it to the new vector.

In any event, process 44 is repeated for the next reference slice selected in process 110. Upon completion of process 44 for all slices in the volume (decision 119 is NO), control passes to process 130.

In process 130, system computer 22 generates surfaces from the vectors remaining in the dataset, where such vectors are linked among a number of surfaces beyond a selected minimum, to avoid the generation of small, spurious, surfaces that do not likely correspond to a fault. For example, process 130 may generate surfaces only for fault ID instances having slice counts above a threshold value of approximately fifty, corresponding to surfaces in which similar vectors are present in at least fifty substantially contiguous slices (i.e., occasional slices may not contain a corresponding vector, without destroying the surface). After generation of the surfaces, referring to FIG. 2, system computer 22 may cause the vectors to be displayed on graphics output device 27, output as hard copy on printer 28, stored in disk storage device 29, or any combination thereof.

Figure 16:
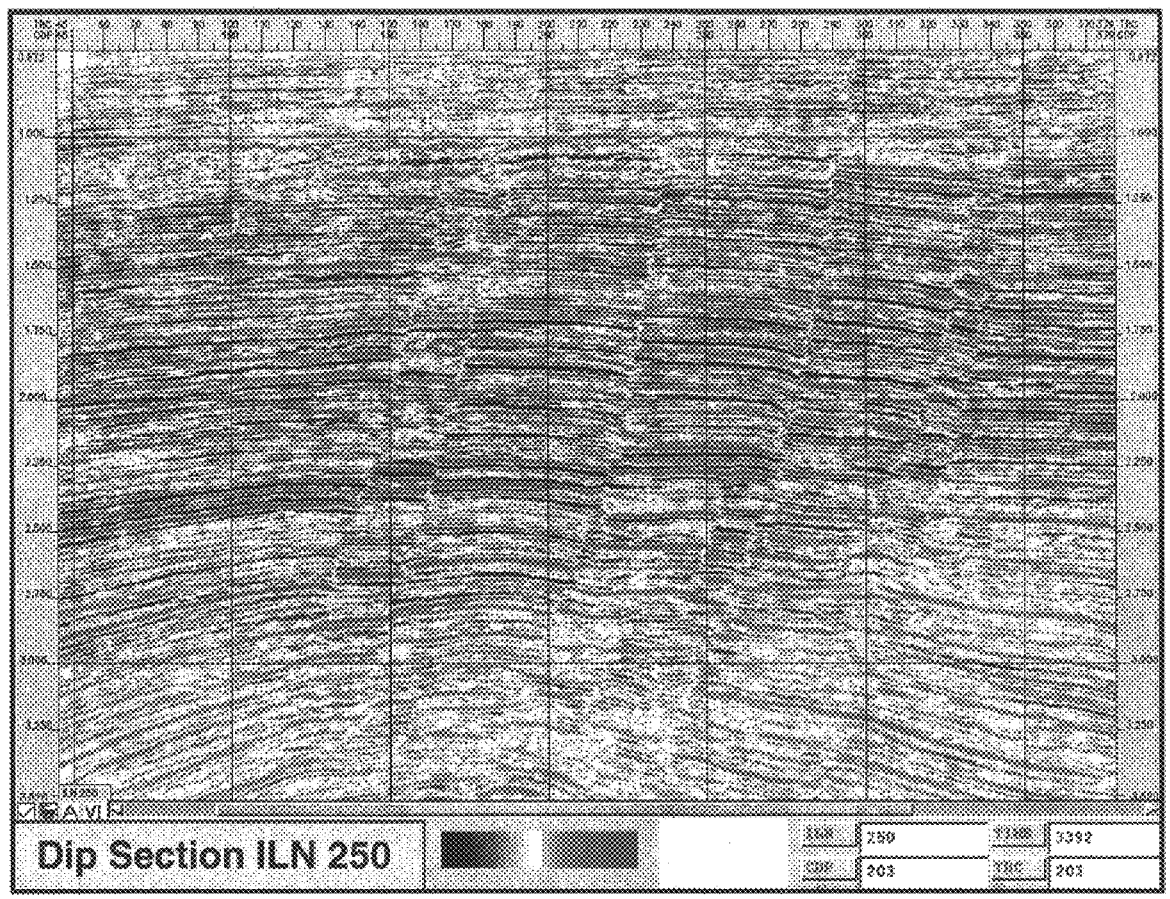
FIGS. 16 through 18 are color diagrams illustrating an exemplary application of the process of FIG. 3 according to the preferred embodiment of the invention.
Figure 17:
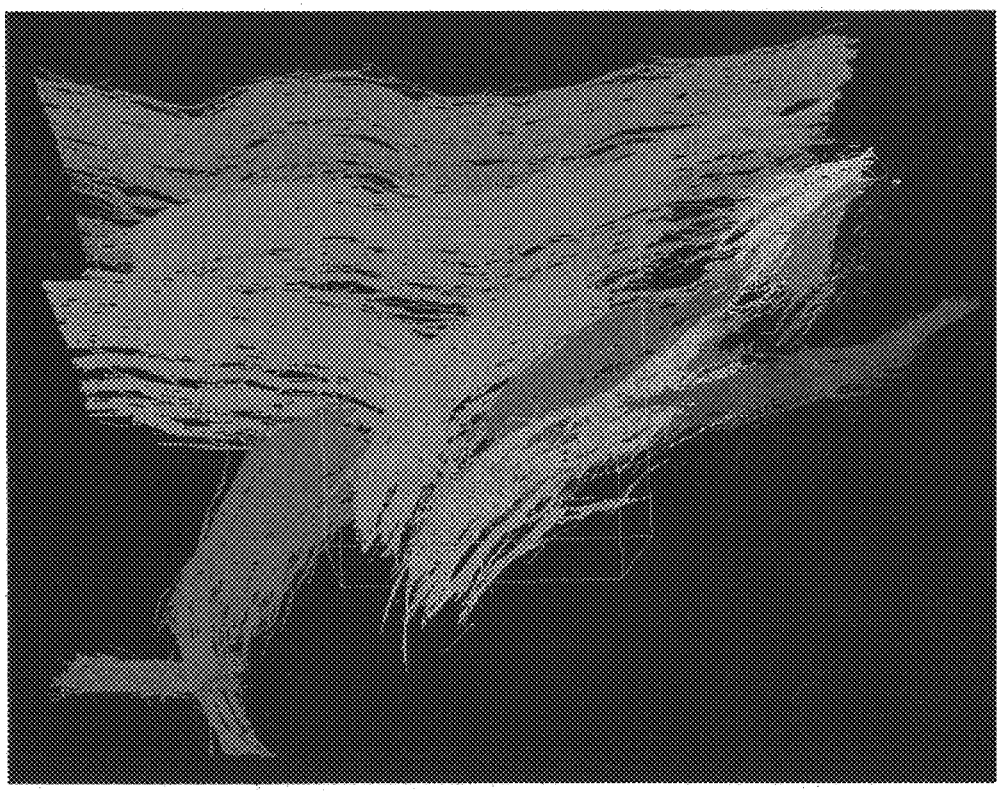
Figure 18:
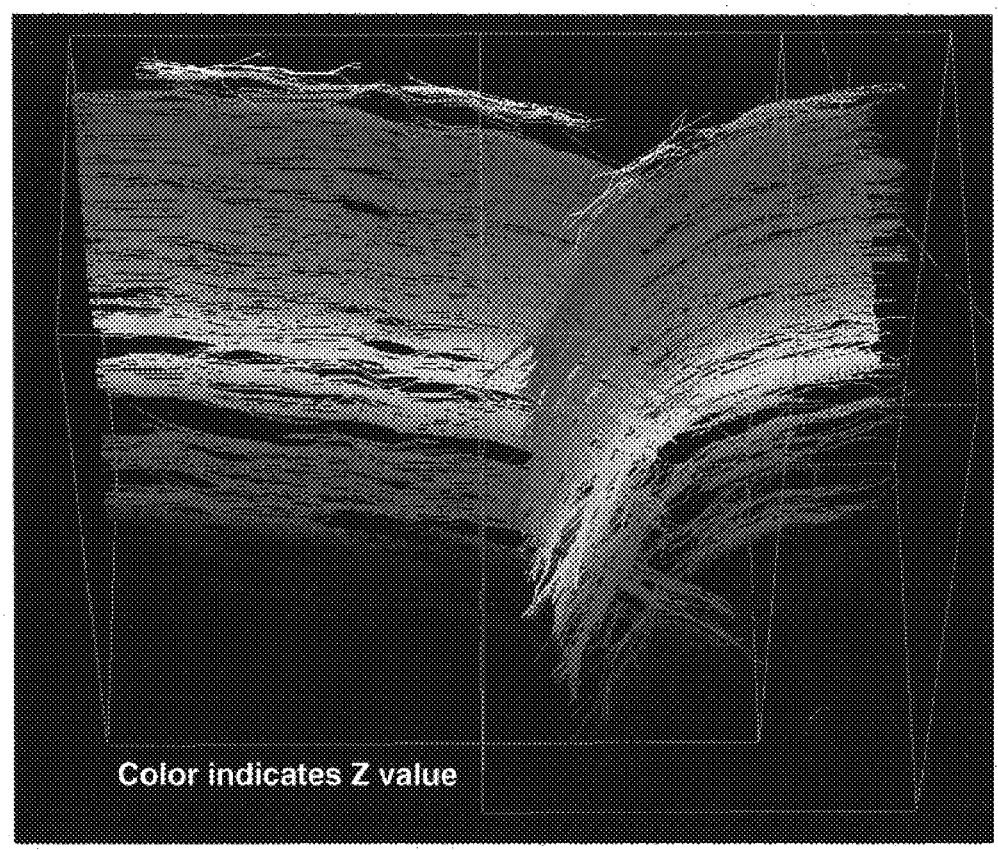

FIGS. 16 through 18 illustrate color examples of an actual 3-D seismic volume upon which the preferred embodiment of the invention has been applied to automatically identify and interpret faults. FIG. 16 is a 2-D cross-sectional view illustrating seismic signals, after common midpoint gather, NMO correction, and stack. As is evident from FIG. 16, breaks in the reflective surfaces are present, but are rather faint in this amplitude plot.

FIG. 17 illustrates a perspective view of the output from the process according to the preferred embodiment of the invention, as applied to the 3-D seismic volume from which the cross-section of FIG. 16 was taken. As illustrated in FIG. 17, multiple fault surfaces are made visible, each fault surface made up of multiple vectors from lateral slices through the 3-D seismic volume. The output of FIG. 17 is contemplated to be representative of output that may be provided from process 44 of FIG. 3, in that surfaces are generated from vectors that are present in at least a minimum number of contiguous surfaces. FIG. 18 is a close-up view of a portion of FIG. 17 (within the outlined inset volume), in which color coding of depth is applied to the generated intersecting surfaces. FIGS. 17 and 18 thus illustrate that the preferred embodiment of the present invention provides improved visibility and interpretation of fault surfaces, especially relative to conventional amplitude plots exemplified by FIG. 16.

As evident from the foregoing, the present invention provides important benefits in the prospecting for oil and gas reserves. The present invention enables the automated identification and interpretation of fault surfaces in 3-D seismic volumes, in a manner that provides high resolution and useful results.

Various alternatives in implementation of the present invention are contemplated. For example, referring back to FIG. 3, it is contemplated that processes 38, 40 may be performed in a three-dimensional manner, rather than on a slice-by-slice basis. For example, process 38 may be modified to enhance planar features (rather than linear features) in a stack of several filtered slices (rather than in a single slice), and process 40 may be modified to detect planes (rather than lines) in an enhanced stack of several slices (rather than a single slice). According to these modifications, the windows, centered about the pixel of interest would be three-dimensional windows, rather than two-dimensional windows, with the methods of analysis extended accordingly.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to identify faults from a plurality of seismic signals arranged in a 3-D seismic volume, comprising the steps of:

selecting a region of the 3-D seismic volume;

for each of a plurality of pixels of interest in the selected region, assigning amplitude and direction indicators by:
defining a window of pixels surrounding the pixel of interest;
summing intensity values of pixels in the window along each of a plurality of directions through the window, each sum including the intensity of the pixel of interest;
assigning an amplitude indicator to the pixel of interest corresponding to a maximum sum determined in the summing step; and
assigning a direction indicator corresponding to the direction associated with the maximum sum;

tracing lines in the selected region by:
locating a local maximum pixel in the selected region;
interrogating the amplitude indicators in a plurality of adjacent pixels near the direction indicator associated with the local maximum pixel;
comparing the direction indicator of the adjacent pixel having the largest amplitude indicator to the direction indicator of the local maximum pixel; and
responsive to the direction indicator of the adjacent pixel having the largest amplitude indicator being near the direction indicator of the local maximum pixel, substituting the adjacent pixel having the largest amplitude indicator for the local maximum pixel and repeating the interrogating and comparing steps;

repeating the selecting, assigning, and tracing steps for a plurality of regions; and linking lines traced in the plurality of selected regions into surfaces representative of faults.

2. The method of claim 1, wherein the selected region corresponds to a lateral slice of the 3-D seismic volume.

3. The method of claim 2, wherein the tracing step further comprises:

also responsive to the direction indicator of the adjacent pixel having the largest amplitude indicator being near the direction indicator of the local maximum pixel, storing a vector indicator in association with the lateral slice; and advancing a counter value associated with the line including the local maximum.

4. The method of claim 3, further comprising:

after the tracing step, comparing the counter values associated with each of the lines with a minimum value; and discarding lines having counter values less than the minimum value.

5. The method of claim 2, wherein the linking step comprises:

selecting a first lateral slice;

for each traced line in the first lateral slice, interrogating a plurality of adjacent lateral slices to the first lateral slice to determine if a similar traced line is present therewithin and, responsive to at least one of the adjacent lateral slices having a similar traced line, maintaining the traced line in the first lateral slice;

repeating the selecting, interrogating, and maintaining steps for each of a plurality of lateral slices; and generating a surface from a plurality of similar lines detected in the selecting, interrogating, and maintaining steps over a substantially contiguous sequence of lateral slices.

6. The method of claim 2, further comprising:

prior to the selecting step, generating a fault-enhanced 3-D seismic volume.

7. The method of claim 2, further comprising:

filtering stripe artifacts from the selected lateral slice.

8. The method of claim 7, wherein the filtering step comprises:

selecting a window surrounding a first pixel of interest;

determining row average pixel intensities for each row in the selected window;

determining a median row average pixel intensity;

adjusting the first pixel of interest by subtracting the row average pixel intensity for the row containing the first pixel of interest from the intensity of the first pixel of interest, and adding the median row average pixel intensity thereto;

repeating the selecting, determining, and adjusting steps for each of a plurality of pixels of interest in the selected lateral slice.

9. The method of claim 2, further comprising:

prior to the step of assigning amplitude and direction indicators, enhancing intensity values of each pixel in the selected lateral slice according to the extent to which the pixel resides in a line.

10. The method of claim 1, further comprising:

graphically displaying the surfaces representative of faults.

11. A computer system for identifying faults from a plurality of seismic signals arranged in a 3-D seismic volume, comprising:

computer-readable memory for storing data corresponding to seismic survey signals obtained for a 3-D seismic survey;

an output device;

a system computer, coupled to the computer-readable memory and to the output device, and programmed to perform the operations of:

selecting a region of the 3-D seismic volume;

for each of a plurality of pixels of interest in the selected region, assigning amplitude and direction indicators by:

defining a window of pixels surrounding the pixel of interest;

summing intensity values of pixels in the window along each of a plurality of directions through the window, each sum including the intensity of the pixel of interest;

assigning an amplitude indicator to the pixel of interest corresponding to a maximum sum determined in the summing step; and assigning a direction indicator corresponding to the direction associated with the maximum sum;

tracing lines in the selected region by:

locating a local maximum pixel in the selected region;

interrogating the amplitude indicators in a plurality of adjacent pixels near the direction indicator associated with the local maximum pixel;

comparing the direction indicator of the adjacent pixel having the largest amplitude indicator to the direction indicator of the local maximum pixel; and responsive to the direction indicator of the adjacent pixel having the largest amplitude indicator being near the direction indicator of the local maximum pixel, substituting the adjacent pixel having the largest amplitude indicator for the local maximum pixel and repeating the interrogating and comparing steps;

repeating the selecting, assigning, and tracing steps for a plurality of regions;

linking lines traced in the plurality of selected regions into surfaces representative of faults; and forwarding data corresponding to the surfaces representative of faults to the output device for display.

12. The system of claim 11, wherein the computer-readable memory is for storing fault-enhanced data corresponding to the seismic survey signals.

13. The system of claim 11, wherein the selected region corresponds to a lateral slice of the 3-D seismic volume.

14. The system of claim 13, wherein the computer is further programmed to perform the tracing operation by:

also responsive to the direction indicator of the adjacent pixel having the largest amplitude indicator being near the direction indicator of the local maximum pixel, storing a vector indicator in association with the lateral slice; and advancing a counter value associated with the line including the local maximum.

15. The system of claim 14, wherein the computer is further programmed to perform the operations of:

after the tracing step, comparing the counter values associated with each of the lines with a minimum value; and discarding lines having counter values less than the minimum value.

16. The system of claim 13, wherein the computer is further programmed to perform the linking operation by:

selecting a first lateral slice;

for each traced line in the first lateral slice, interrogating a plurality of adjacent lateral slices to the first lateral slice to determine if a similar traced line is present therewithin and, responsive to at least one of the adjacent lateral slices having a similar traced line, maintaining the traced line in the first lateral slice;

repeating the selecting, interrogating, and maintaining steps for each of a plurality of lateral slices; and generating a surface from a plurality of similar lines detected in the selecting, interrogating, and maintaining steps over a substantially contiguous sequence of lateral slices.

17. The system of claim 13, wherein the computer is further programmed to filtering stripe artifacts from the selected lateral slice by:

selecting a window surrounding a first pixel of interest;

determining row average pixel intensities for each row in the selected window;

determining a median row average pixel intensity;

adjusting the first pixel of interest by subtracting the row average pixel intensity for the row containing the first pixel of interest from the intensity of the first pixel of interest, and adding the median row average pixel intensity thereto;

repeating the selecting, determining, and adjusting steps for each of a plurality of pixels of interest in the selected lateral slice.

* * * * *